US010016088B2

(12) United States Patent
Gross et al.

(10) Patent No.: US 10,016,088 B2
(45) Date of Patent: Jul. 10, 2018

(54) COLD BREW FILTER BASKET AND BREWING APPARATUS

(71) Applicant: Eternal East (HK) Ltd., Hong Kong (CN)

(72) Inventors: Charles Brian Gross, Greeley, CO (US); Derek Tyler Berthold, Noblesville, IN (US)

(73) Assignee: ETERNAL EAST (HK) LTD., Hong Kong (CN)

( * ) Notice: Subject to any disclaimer, the term of this patent is extended or adjusted under 35 U.S.C. 154(b) by 157 days.

(21) Appl. No.: 15/083,000

(22) Filed: Mar. 28, 2016

(65) Prior Publication Data

US 2016/0296062 A1 Oct. 13, 2016

Related U.S. Application Data

(60) Provisional application No. 62/144,531, filed on Apr. 8, 2015.

(51) Int. Cl.
*A47J 31/06* (2006.01)
*A47J 31/44* (2006.01)

(52) U.S. Cl.
CPC ......... *A47J 31/446* (2013.01); *A47J 31/0615* (2013.01)

(58) Field of Classification Search
CPC .... A47J 31/0615; A47J 31/446; A47J 31/005; A23F 5/262; A23F 3/18
USPC ......... 99/285, 298, 323, 317, 318, 319, 321, 99/322; 426/431
See application file for complete search history.

(56) References Cited

U.S. PATENT DOCUMENTS

| 1,368,640 | A | | 2/1921 | Melchior | |
|---|---|---|---|---|---|
| D239,906 | S | | 5/1976 | Hauenstein | |
| 4,069,751 | A | * | 1/1978 | Gronwick | A47J 31/02 99/306 |
| 5,072,660 | A | * | 12/1991 | Helbling | A47J 31/007 426/112 |
| D334,874 | S | | 4/1993 | Mealey et al. | |
| 5,791,503 | A | | 8/1998 | Lyons | |
| 6,354,449 | B1 | | 3/2002 | Smith | |
| 8,221,813 | B2 | | 7/2012 | Boul | |
| D694,579 | S | | 12/2013 | Khubani | |
| D695,066 | S | | 12/2013 | Nakajima | |

(Continued)

OTHER PUBLICATIONS

Extended European Search Report dated Aug. 8, 2016 in related European application 16163844.0.

(Continued)

*Primary Examiner* — Dana Ross
*Assistant Examiner* — Joseph Iskra
(74) *Attorney, Agent, or Firm* — Polson Intellectual Property Law, PC; Margaret Polson

(57) ABSTRACT

A cold coffee brewing device is disclosed. A filter basket is provided that can rest at two positions, a first brewing position and a second draining position, the draining position being located above the liquid being brewed to allow the filter basket to drain without further support. The filter basket rests on a first width in the brewing position and on a second width in the draining position. The first and second width can either be formed in to a container for brewing or an adaptor can be provided to create the first and second width on the container. The filter basket has sections that are adapted to rest on the first and second width respectively.

20 Claims, 11 Drawing Sheets

(56) References Cited

U.S. PATENT DOCUMENTS

| | | |
|---|---|---|
| D707,489 S | 6/2014 | Hertaus |
| D724,906 S | 3/2015 | Kent |
| D730,111 S | 5/2015 | Beller |
| D750,449 S | 3/2016 | Kostler et al. |
| D764,865 S | 8/2016 | Hertaus |
| D771,434 S | 11/2016 | Burrows |
| 2002/0130137 A1* | 9/2002 | Greenwald ............ A47J 31/467 222/54 |
| 2004/0134357 A1* | 7/2004 | Cai ..................... A47J 27/2105 99/279 |
| 2006/0278091 A1* | 12/2006 | Rutigliano ............ A47J 31/007 99/279 |
| 2011/0303095 A1* | 12/2011 | Fu ........................... A47J 31/08 99/317 |
| 2015/0072058 A1* | 3/2015 | Johnson .............. A47J 31/0615 426/431 |
| 2016/0227956 A1* | 8/2016 | Ko .......................... A47J 31/06 |

OTHER PUBLICATIONS

Design U.S. Appl. No. 29/525,826, filed May 8, 2015.
Design U.S. Appl. No. 29/536,453, filed Aug. 17, 2015.

* cited by examiner

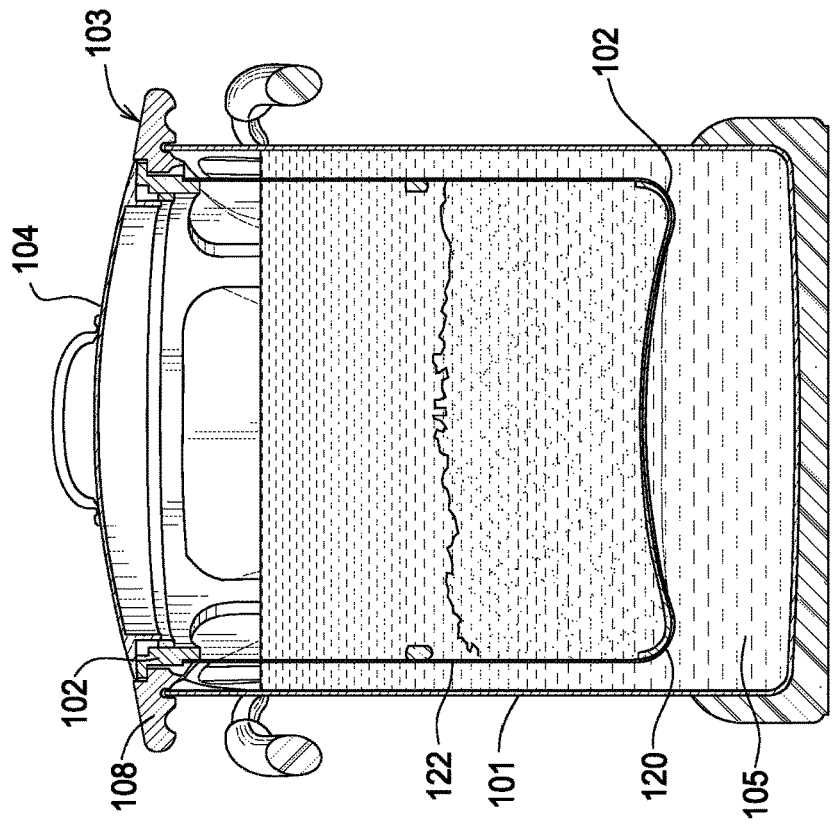
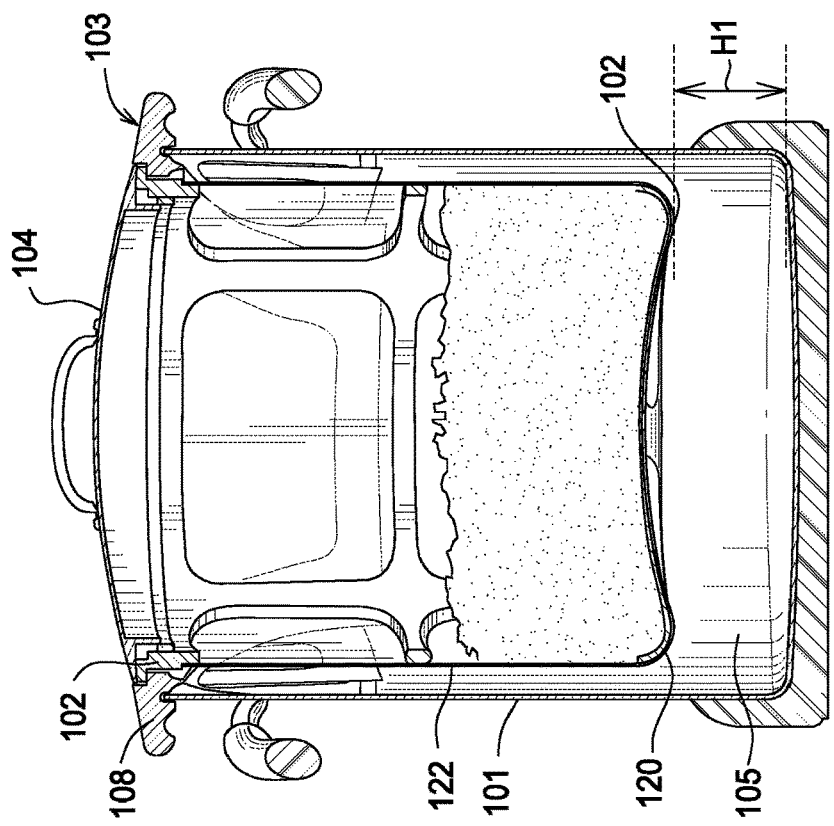
FIG.3A
FIG.3B

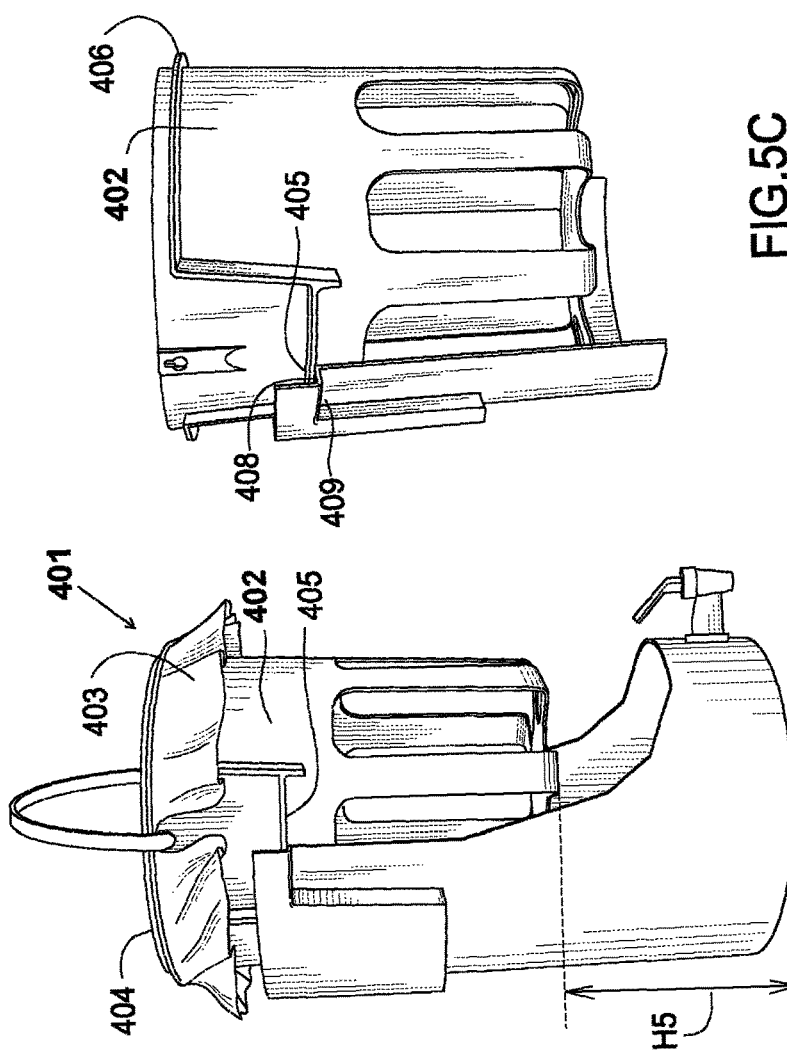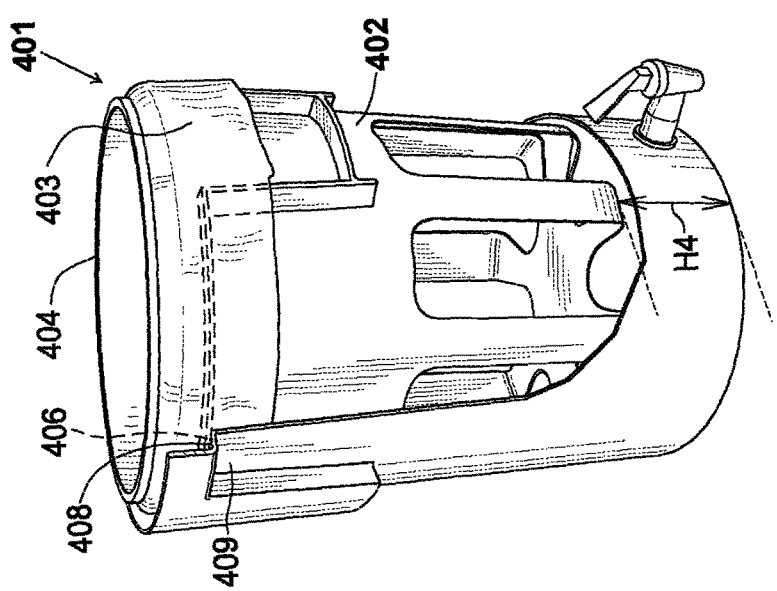

COLD BREW FILTER BASKET AND BREWING APPARATUS

CROSS REFERENCE APPLICATIONS

This application is a non-provisional application claiming the benefit of provisional application No. 62/144,531 filed Apr. 8, 2015, the disclosure of which are hereby incorporated by reference for all purposes

BACKGROUND

Cold brewed coffee is a low acid, healthy and refreshing method to consume coffee. It is created by steeping coffee grounds in cold water for 12-24 hours and then filtering and draining the extract from the coffee grounds. The current state of art is to either mix the water and coffee together into a bucket then pour through a cheese cloth filter or put the product into a paper bag and then tie it with a string and put this bag inside a mesh bag to lessen the chance of the paper bag breaking. When it is time to filter the user lifts the bag out of the coffee extract and holds it and squeezes it to get the remaining coffee extract out. The bag weights over 14 pounds. The second issue with this system is that the coffee is held so tightly that the osmosis of the coffee that is extracted from the grounds is impeded and it is not unusual to find dry coffee grounds in the bag after removal.

The foregoing example of the related art and limitations related therewith are intended to be illustrative and not exclusive. Other limitations of the related art will become apparent to those of skill in the art upon a reading of the specification and a study of the drawings.

SUMMARY

One aspect of the present disclosure is to provide an easy to use large scale cold brew system.

One aspect of the present disclosure is to maximize the contact of the grounds with the water.

On aspect of the present disclosure is to reduce the weight a user is required to lift and/or hold in place while the water is drained from the grounds.

One aspect of the present disclosure is to enable a user to easily drain as much water and coffee extract as possible from the grounds.

The problem is solved by an infusing device for use with a container having an open top, a rim around the open top and an interior space having at least a first width, at least a part of a container having a second width, the second width being smaller than the first width; the infusing device comprising:

a filter basket size to fit at least substantially inside an interior space;

the filter basket comprising a ridge outwardly extending from an outer surface of the filter basket, said ridge being located at or near an upper rim of the filter basket and extending around at least a majority of the diameter of the filter basket;

the ridge being sized to rest on the rim of a container in a first brewing position;

the filter basket having at least one holding section; said holding section having a width that will fit inside the first width, but not inside the second width;

the holding section having a bottom edge, the bottom edge of the holding section being distance H2 down from the edge of a top edge of the filter basket;

the holding section being sized to rest on the second width of a container, holding the basket in a second, draining position, the draining position being distance H2 higher than the brewing position.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIGS. 3a-3c are cross sectional views of the first embodiment during use.

FIGS. 5a-5c are partial cut away views of the second embodiment of the cold brewing device in use.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While the present disclosure will discuss the device in terms of using it to cold brew coffee, it is to be understood that the device could be uses to extract any desired extract out of a particulate material with a given solvent. No limitation is intended, or should be inferred. Further, although it is discussed as cold brew device, no limitation on the temperature of the solvent is intended or should be inferred.

Figure 1:
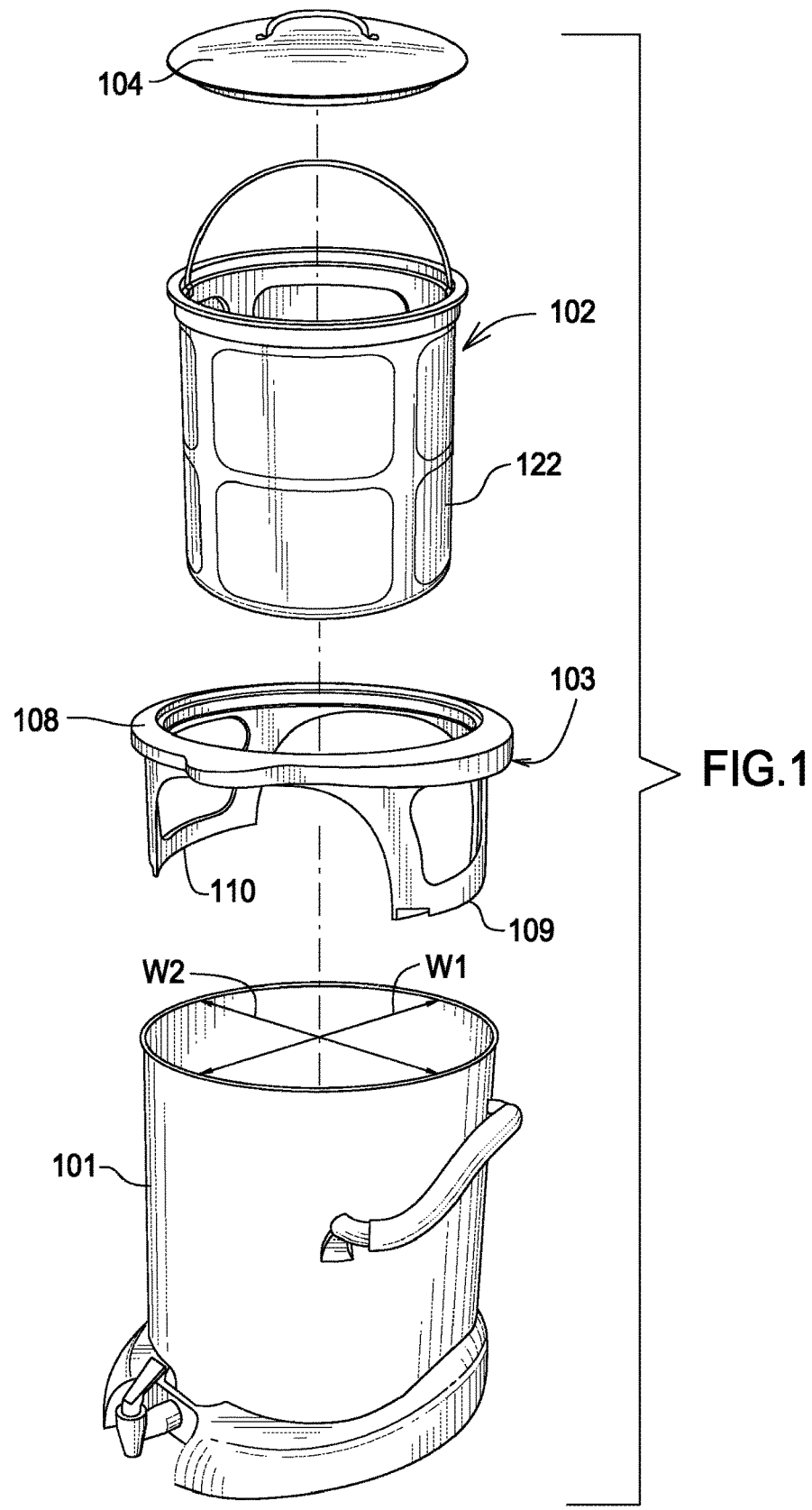
FIG. 1 is an exploded view of one embodiment of a cold brew device.

Referring first to FIGS. 1-3c, a first embodiment of a cold brew device has a fluid container 101, a filter basket 102, filter stand 103 and lid 104. In the depicted embodiment the fluid container 101 has a reservoir 105 that will hold approximately 5 gallons of fluid. Other sizes could be used as well; no limitation is intended or should be inferred. As best seen in FIG. 1, the fluid container 101 can be provided with a spigot 107 to allow the brewed coffee to be easily decanted into any desired container once brewing is complete. As seen in FIG. 3a, the filter 103 fits inside the reservoir 105, preferably with height H1 between the bottom of the filter basket 120 and the bottom of the reservoir when in the position shown in FIG. 2. This allows the spigot 107 to be used at any time without being blocked by the filter basket 102. The filter basket 102 is supported by filter stand 103. In the depicted embodiment the filter basket 102 has a gold plated, laser etched metal permanent filter 122 that is sufficient to filter the ground coffee without use of a paper filter. These are referred to in the art as permanent filters. In an alternate embodiment, the filter body 122 could have larger holes and be designed to support a disposable paper filter (not shown).

Figure 3C:
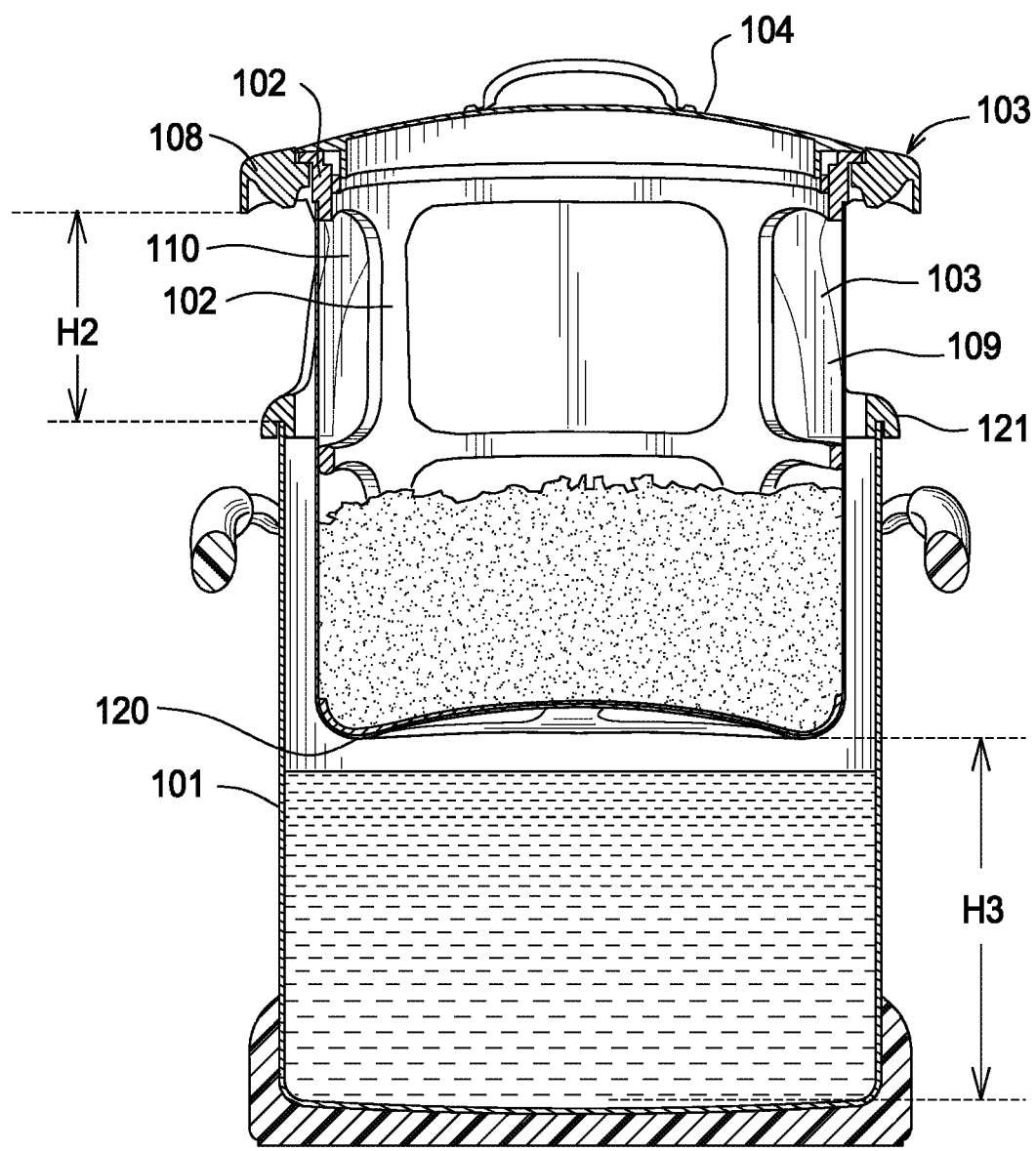

Referring next to FIG. 3c, in the depicted embodiment to move the filter basket from the resting brewing position to the resting draining position, the filter stand 103 with the filter basket suspending in it is raised and rotated 90 degrees and then lowered to the resting draining position shown in FIG. 3c. In the depicted embodiment, the reservoir 101 and the filter stand have an overall oval shape when viewed from above, as seen in FIG. 1, creating a first width W1 and a second, narrower, width W2. Rotating the filter stand and basket sets the wider first width W1 of the stand over the narrower width W2 of the reservoir. This allows the filter stand to hold the position shown in FIG. 3c for draining as will be discussed further below. When the filter stand is rotated back 90 degrees, the first width W1 of the reservoir lines back up with the first width W1 of the stand, putting the filter basket in the position shown FIG. 3b for steeping. It is to be understood that many other configurations of filter basket and filter stand could be utilized to provide the two stage process discussed herein, including filter stands created as an integral part of the filter basket 103 as will be discussed below with the second embodiment. No limitation to a particular embodiment or configuration in intended or should be inferred.

Figure 2:
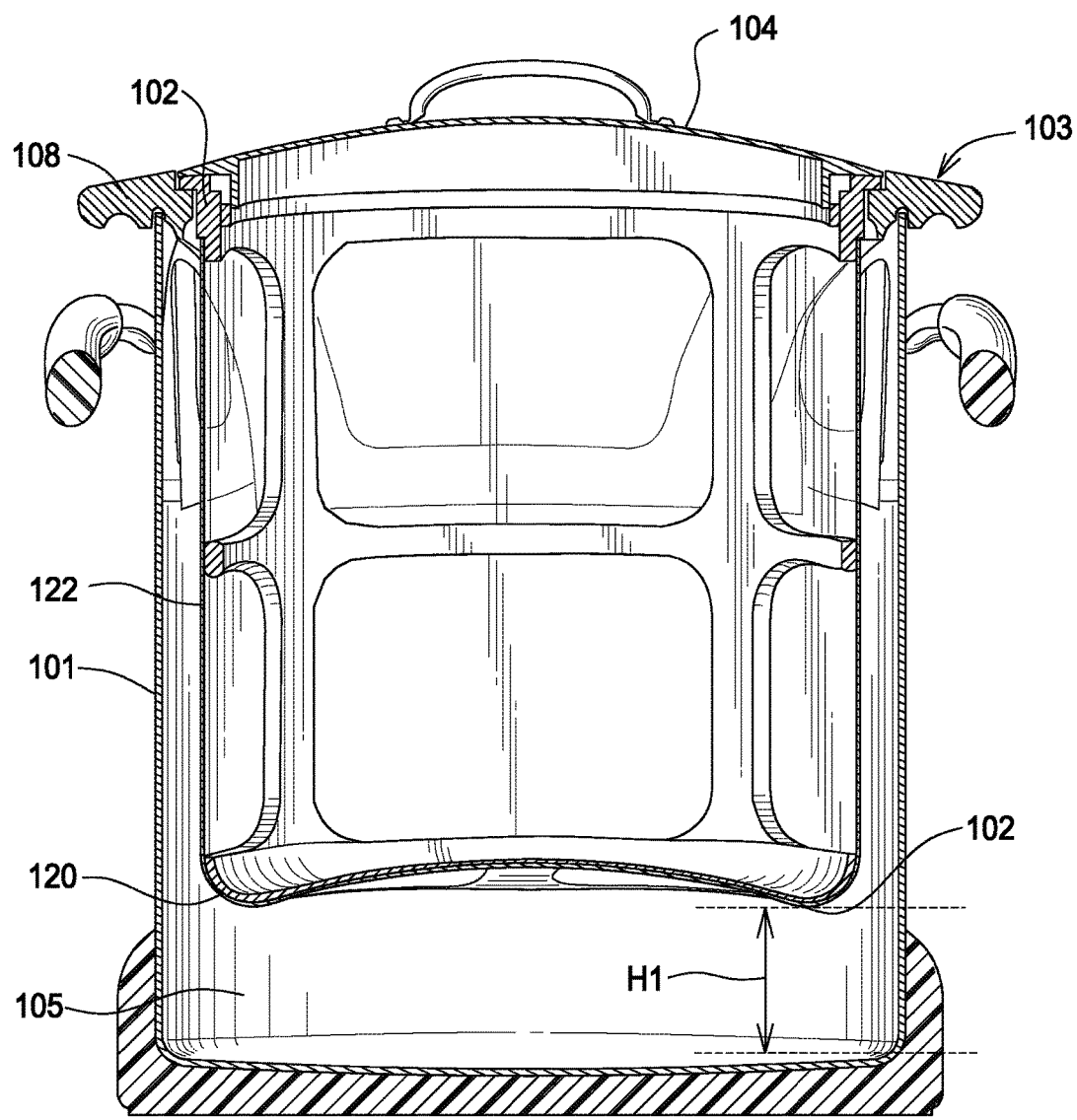
FIG. 2 is a cross sectional view of one embodiment of a cold brew device in the brewing configuration.

Referring next to FIGS. 3a-3c, in use ground coffee is placed in the filter basket 102 as seen in FIG. 3a. In the depicted embodiment, the filter basket 102 is sized to hold five pounds of ground coffee. It is important not to overfill the filter basket 102 with ground coffee, to allow the coffee grounds to fully suspend in the water as seen in FIG. 3b. The water level should fully cover the coffee grounds, ensuring that all the grounds are in good contact with the water to allow for maximum extracting of grounds. The filter basket 102 is supported by the filter stand 103 on the rim of the reservoir 101. The filter stand 103 in the depicted embodiment has a rim 108 that rests on the rim 121 at top of the reservoir 101 in a first brewing position as seen in FIG. 2, FIGS. 3a and 3b. Filter stand 103 also has legs 109, 110 that rest on the rim 121 of the reservoir 101 in a second position draining position on the reservoir as seen in FIG. 3c. In the depicted embodiment the legs 109,110 are located along the long sides of the oval to allow the legs to slip into the reservoir 101 when the oval shape of the filter stand is aligned with the oval shape of the reservoir and allows the bottom of the legs 109, 110 to rest on the rim of the reservoir when the filter stand is lifted and rotated 90 degrees as seen in FIG. 3c. The legs have a height H2, which is chosen such that the filter basket 102 is suspended above the coffee extract even when all of the fluid is drained out of the grounds at height H3 seen in FIG. 3c. This allow the user to recover a maximum amount of coffee extract from a given amount of coffee grounds without having to hold the wet filter and coffee grounds over the reservoir.

Figure 4:
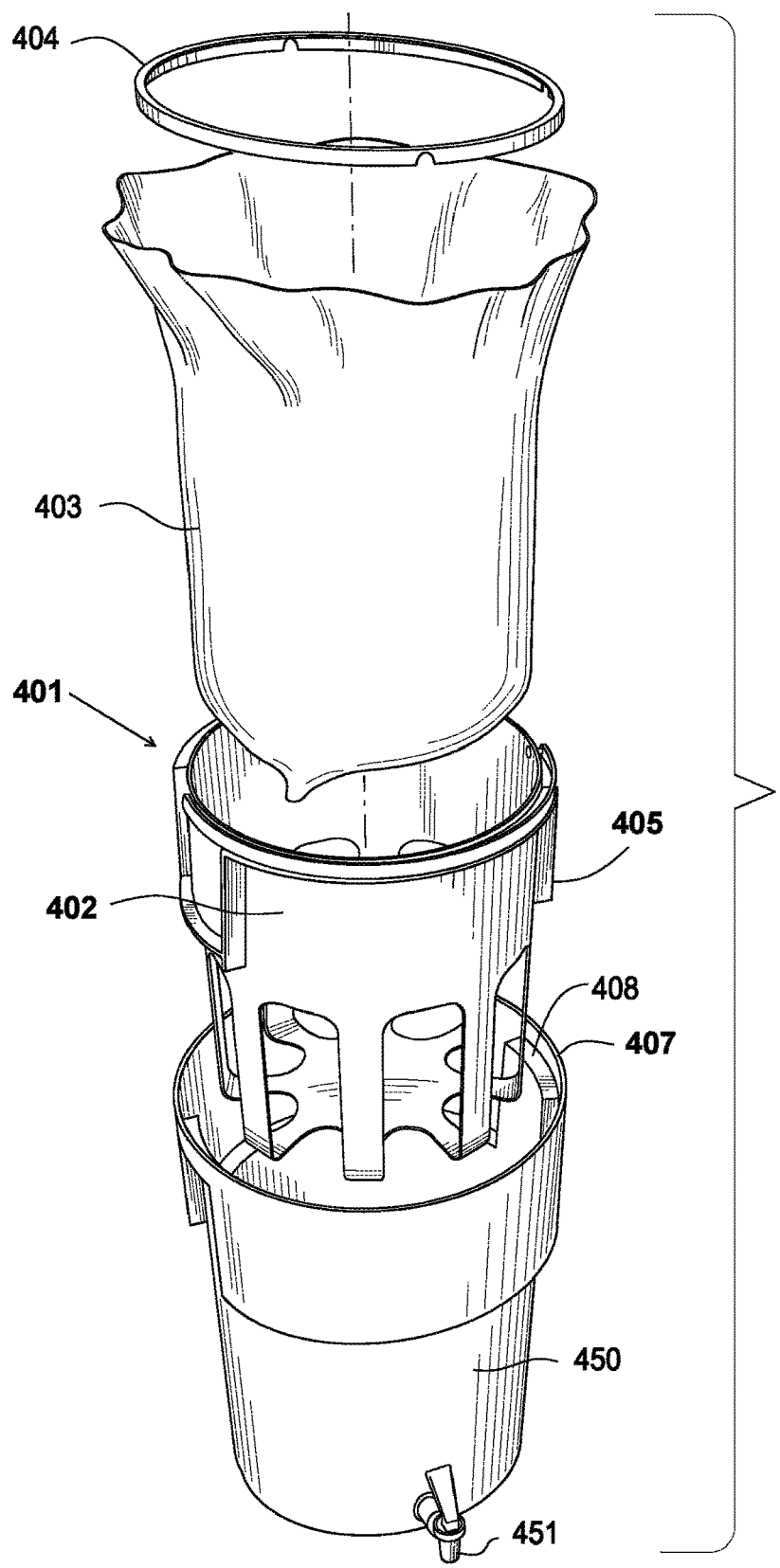
FIG. 4 is an exploded view of a second embodiment of the cold brewing device.

Referring next to FIGS. 4 through 5c, a second embodiment of the cold brew device is a filter basket 401 that can be used as a retrofit device to allow existing cold brew devices 450 to have a filter basket (The depicted embodiment of the basket can hold up to 7 pounds of coffee when used with a ten-gallon bucket. The standard ratio is one pound of coffee to one gallon of brewing water, however a wide range of ratios are used to accommodate consumer preference.) with the two position feature of the present disclosure. Currently, much of the industry uses standard five gallon to ten gallon buckets with a spigot 451 to brew cold coffee extract in commercial amounts. Filter basket 401 is designed to be used with the existing devices. In the depicted embodiment the filter basket 401 has a filter body 402 that is designed to support a disposable paper filter 403 which can be held in place in use by retaining ring 404. Alternatively, a gold plated, laser etched or stainless steel photo etched metal permanent filter (not shown) that is sufficient to filter the ground coffee without use of a paper filter could be provided instead, or a combination could be used.

As best seen in FIGS. 5a to 5c, the filter basket 401 has a member 405 extending from each side the outer surface of the filter basket 401. The bucket 450 handles 409 molded into the body of the bucket 450 such that user can get their hand under the rim 407 of the bucket. This creates a section of the interior of the bucket 450 that has a narrower width W2 than the rest of the bucket, which has width W1 as can be seen in FIG. 4. The member 405 is configured that it can slip inside the bucket 450 such that the upper rim 406 of filter basket 401 is resting on the upper surface 408 of handle 409 of the bucket 450 as best seen in FIG. 5a, placing the filter basket 401 in the brewing position with the bottom of the basket distance H4 above the bottom of the bucket as seen in FIG. 5a. When the brewing is over, the filter basket is lifted and rotated as seen in FIG. 5b, bringing the member 405 around such that it rests on the upper surface 408 bucket handle 409 and seen in FIGS. 5b and 5c. This suspends the bottom of the filter basket distance H5 above the bottom of the bucket, allowing the grounds to drain as described above.

Figure 8:
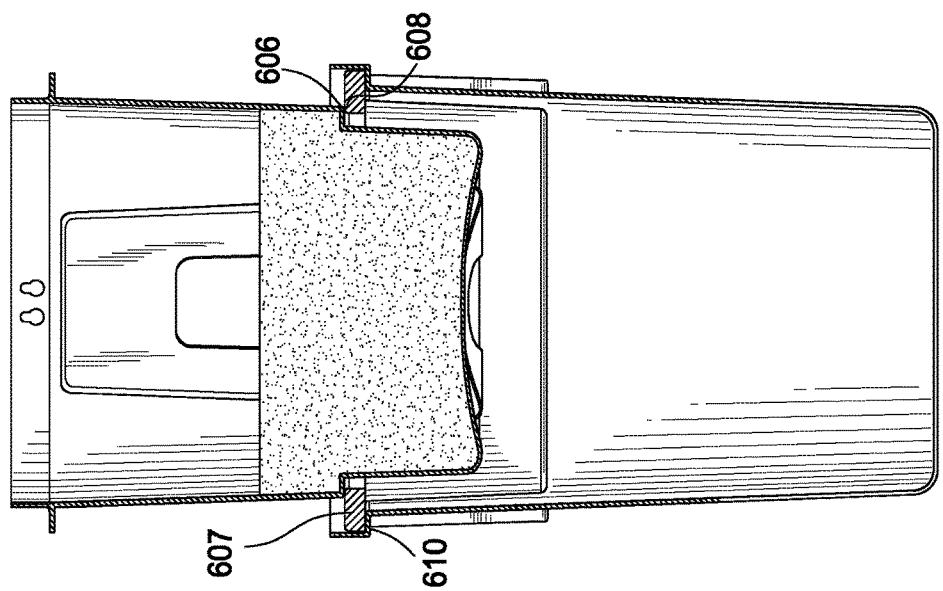
FIG. 8 is a cross sectional view of the third embodiment in the draining position.
Figure 7:
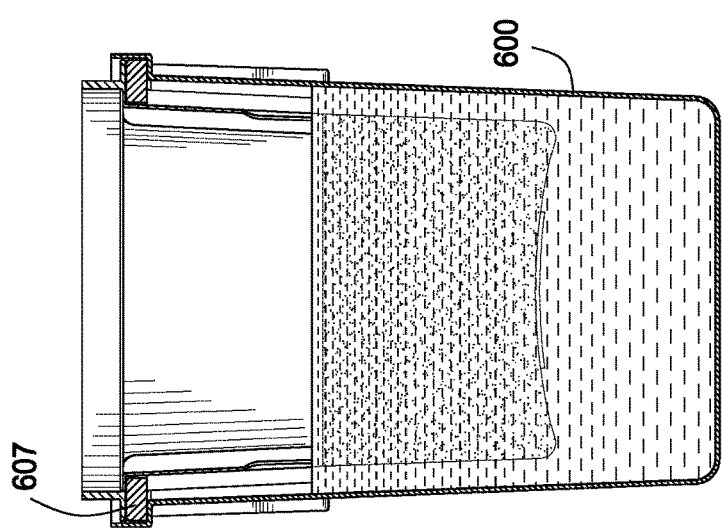
FIG. 7 is a cross sectional view of a third embodiment in the brewing position.
Figure 6:
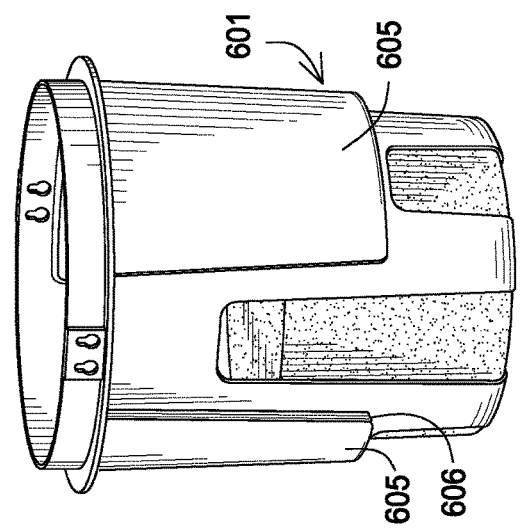
FIG. 6 is a perspective view of a third embodiment of a filter basket
Figure 9:
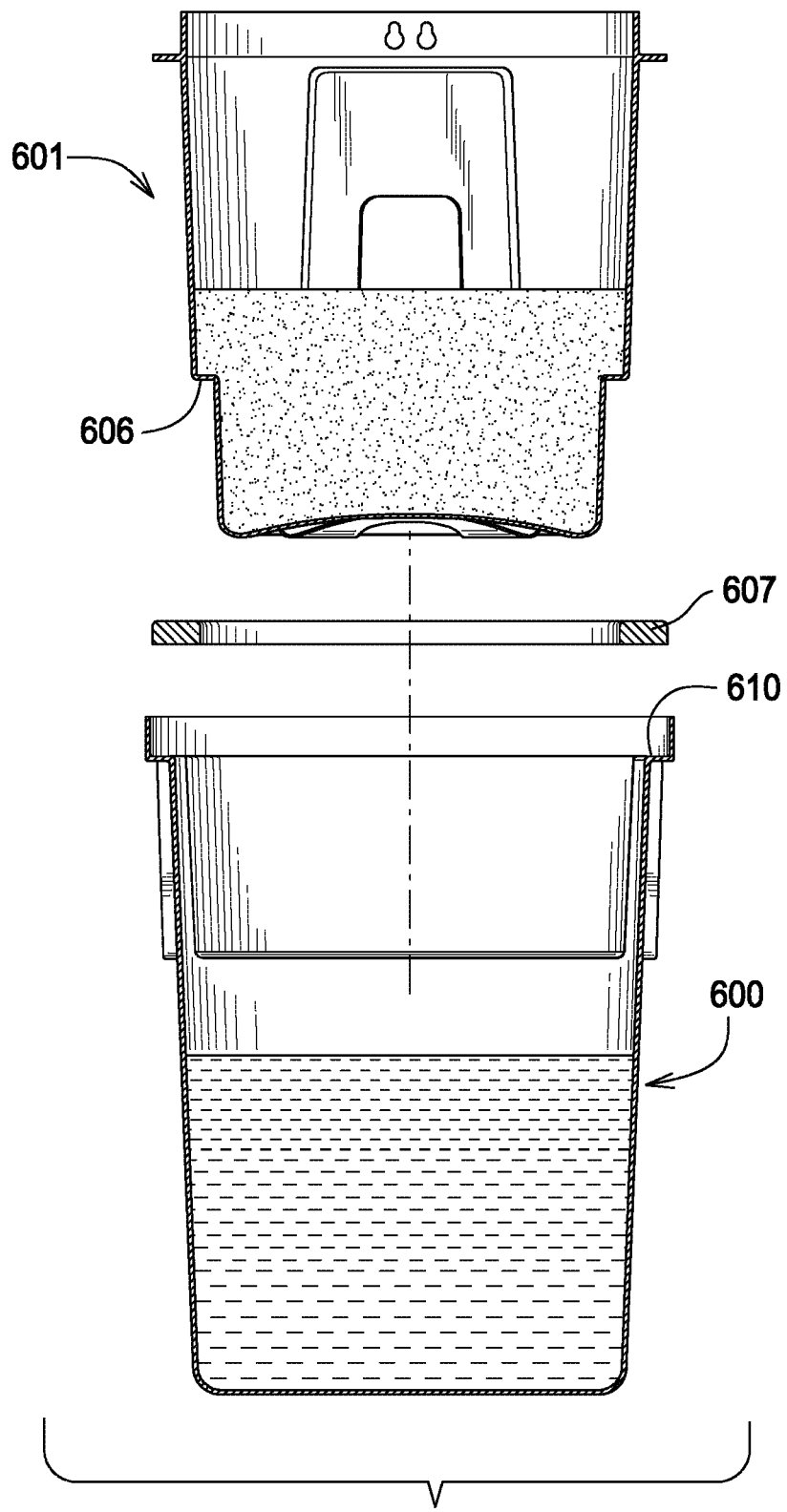
FIG. 9 is an exploded view of the third embodiment.
Figure 10:
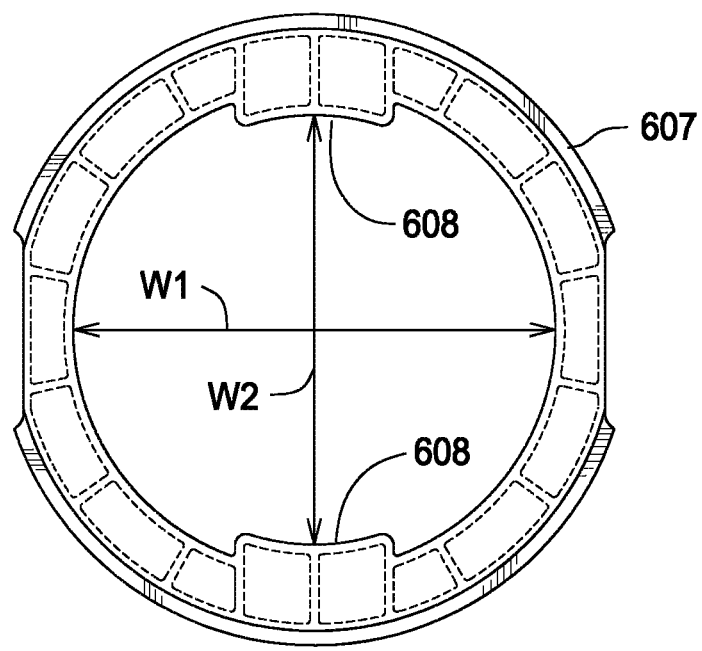
FIG. 10 is a plan view of the adapter ring of the third embodiment.
Figure 11:
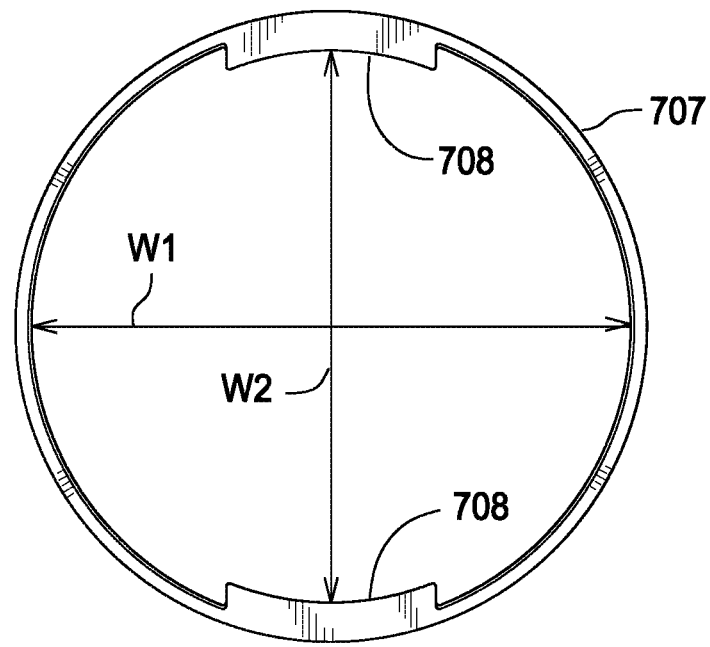
FIG. 11 is a plan view of an alternate embodiment of the adapter ring of the third embodiment.

Referring next to FIGS. 6 through 10, a third embodiment allows the use of a bucket 600 that does not have existing handle ridges that would allow a filter basket as described above to be used. Another embodiment of the filter basket 601 is shown in FIG. 6. Filter basket 601 has an extending section 605 extending from each side the outside surface of the filter basket 601. The extending section 605 has a bottom edge 606. A ring 607 is placed in the inner rim 610 of bucket 600. As seen in FIG. 10, the ring 607 has a generally circular configuration have a width W1 and two inward extensions 608 that create narrower width W2. The extending sections of the filter basket are sized to rest on the inward extension 608 when the basket is oriented as seen in FIG. 8 and to slide inside the ring when the basket is rotated 90 degrees as seen in FIG. 7. An alternate version of the ring 707 is shown in FIG. 11. The ring 707 has inward extensions 708.

Figure 13:
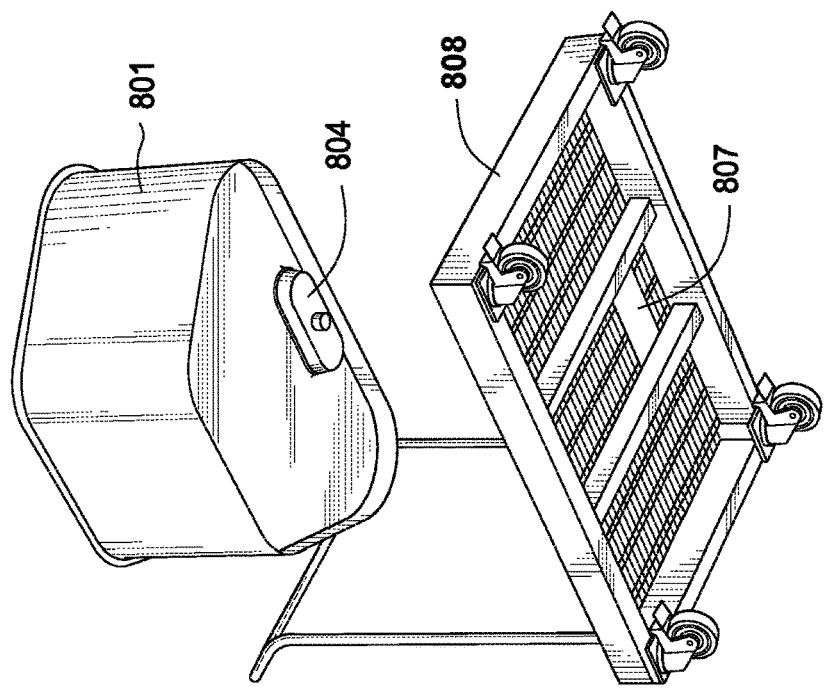
FIG. 13 is a bottom side partially exploded view of the embodiment of FIG. 12.
Figure 12:
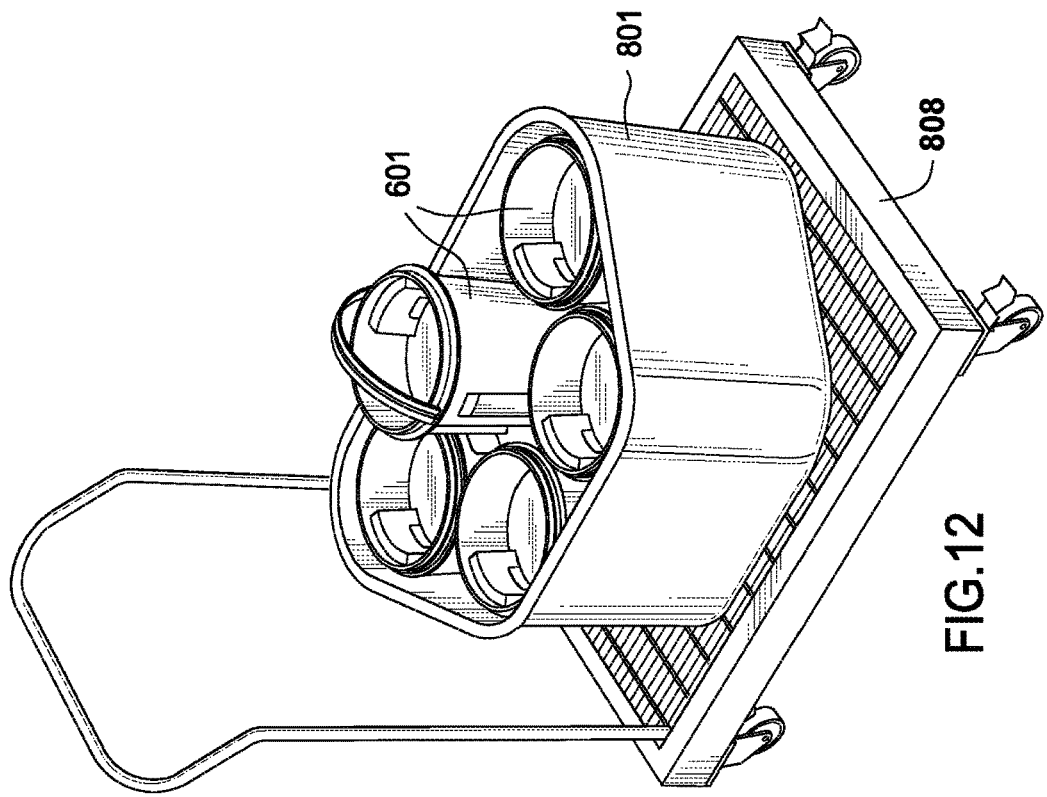
FIG. 12 is an isometric view of a embodiment for using multiple filter baskets at the same time.
Figure 14:
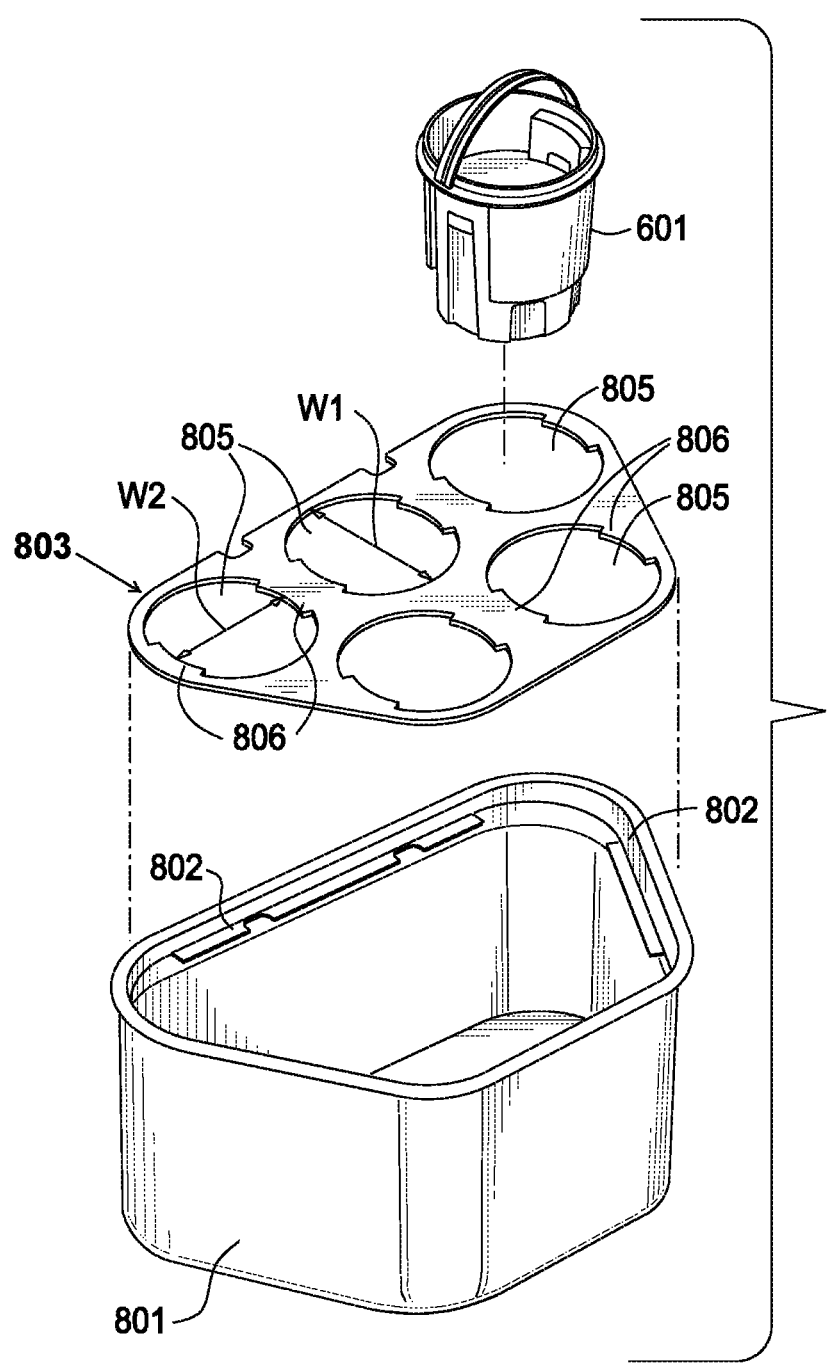
FIG. 14 is an exploded view of the tank, plate and a filter basket.

Referring next to FIGS. 12 to 14, the present inventions can be scaled to have multiple filter baskets in one large container. As see in FIG. 12, a 35 gallon tank 801 can hold up to 5 filter baskets 601. As seen in FIG. 14, the tank 801 has plate support ridges 802 that support filter plate 803. Filter plate 803 has holes 805 that function like ring 607 and 707. Tabs 806 extend into the open center of the holes, creating the first and second width, W1 and W2 for the filter basket 601 to rest on for the brewing position and draining position. Cart 808 can be provided to allow the user to move the tank 801 when full. As best seen in FIG. 13, tank 801 has a drain 804 provided one low section of the tank 801 to allow hoses to be attached for draining the tank of the coffee concentrate. Cart 808 can have opening 807 to provide access to the drain 804.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims

I claim:

1. An infusing device for brewing infusions for human consumption, the infusing device for use with a container having an open top, the container enclosing an interior space having at least a first width and a second width, the second width being smaller than the first width, the infusing device comprising:
   a filter basket to hold infusion ingredients, the filter basket sized to fit at least substantially inside the interior space and configured to rest in a brewing position and in a draining position, the brewing position being positioned a first height lower than the draining position, the filter basket supported within the interior space by a filter basket holder;
   the filter basket holder extending around at least a majority of the perimeter of the filter basket, the filter basket holder having a first holding section and a second holding section, the first holding section positioned higher on the filter basket holder than the second holding section;
   the first holding section comprising at least one ridge extending outward, the at least one ridge sized to rest on a rim of the container in the brewing position;
   the second holding section having a width that will fit inside the first width but not inside the second width of the interior space;
   said width of the second holding section configured to be aligned with the first width in the brewing position and with the second width in the draining position;
   said width of the second holding section comprising at least one surface sized to rest on the rim of the container in the draining position;
   a bottom edge of the surface of the second holding section being the first height down from a bottom edge of the ridge of the first holding section;
   whereby the infusing device is configured to be lifted from the brewing position supported by the first holding section and rotated into the draining position supported by the second holding section.

2. The infusing device of claim 1, wherein the first width and the second width are formed by an oval shape of the container.

3. The infusing device of claim 1, wherein the filter basket is separable from the filter basket holder, and the filter basket nests into the filter basket holder in use.

4. The infusing device of claim 1, wherein the filter basket and the filter basket holder are structurally integrated.

5. The infusing device of claim 1, wherein the second holding section is formed by one or more legs projecting down from the first holding section.

6. An infusing device for brewing infusions for human consumption, the infusing device for use with a container having an open top, the container enclosing an interior space having at least a first width and a second width, the second width being smaller than the first width, the infusing device comprising:
   a filter basket to hold infusion ingredients, the filter basket sized to fit at least substantially inside the interior space and configured to rest in a brewing position and in a draining position, the brewing position being positioned within the interior space a first height lower than the draining position;
   the filter basket comprising a ridge and at least one holding member, a bottom edge of the at least one holding member being positioned the first height down from a bottom edge of the ridge;
   the ridge outwardly extending from an outer surface of the filter basket, the ridge located at or near an upper rim of the filter basket, the ridge being sized to rest on a lip of the container in the brewing position;
   the holding member having a width that will fit inside the first width but not inside the second width of the interior space;
   said width of the holding member aligned with the first width in the brewing position and with the second width in the draining position;
   whereby the filter basket is configured to be lifted from the brewing position supported by the ridge and rotated into the draining position supported by the holding member.

7. The infusing device of claim 6, wherein the first width is an outer rim of the container and the second width is formed by at least one recessed area of the container extending into the interior space therein forming at least one container ridge, the holding member being supported on the at least one container ridge in the draining position.

8. The infusing device of claim 7, wherein the lip of the container is formed by the at least one container ridge.

9. The infusing device of claim 6, wherein the ridge extends around at least a majority of the perimeter of the filter basket.

10. The infusing device of claim 6, wherein the holding section extends around at least a majority of the perimeter of the filter basket.

11. The infusing device of claim 6, wherein the at least one holding section is formed by at least one projection extending outward from the outer surface of the filter basket.

12. The infusing device of claim 6, wherein the at least one holding section is formed by at least one recessed section extending inward from the outer surface of the filter basket.

13. An infusing device for brewing infusions for human consumption, the infusing device for use with a container having an open top, the container enclosing an interior space having at least a first width and a second width, the second width being smaller than the first width, the infusing device comprising:
- a filter basket holder sized to fit in a rim of the container, the filter basket holder having an interior opening therethrough defining the first width and the second width, the first width being formed by a diameter of the interior opening and the second width being formed by two extensions of the filter basket holder extending into the interior opening;
- a filter basket to hold infusion ingredients, the filter basket sized to fit at least substantially inside the interior space and configured to rest in a brewing position and in a draining position, the brewing position being positioned a first height lower than the draining position, the filter basket supported within the interior space by the filter basket holder;
- the filter basket comprising a first holding section and a second holding section, the first holding section having a width larger than the second width, the second holding section having a width that will fit through the first width but not through the second width;
- said width of the first holding section comprising at least one ridge extending outward from an outer surface of the filter basket, the ridge located at or near an upper rim of the filter basket, the ridge sized to rest on the filter basket holder in the brewing position;
- said width of the second holding section comprising two surfaces sized to rest on the two extensions of the filter basket holder in the draining position;
- each of the two surfaces of the second holding section having a bottom edge positioned the first height down from a bottom edge of the ridge of the first holding section;
- the two surfaces of the second holding section being aligned with the first width in the brewing position and with the second width in the draining position;
- whereby the filter basket is configured to be lifted from the brewing position supported by the first holding section and rotated into the draining position supported by the second holding section.

14. The infusing device of claim 13, wherein the filter basket holder is ring-shaped.

15. The infusing device of claim 13, wherein the width of the first holding section of the filter basket is larger than the first width.

16. The infusing device of claim 13, wherein the ridge extends around at least a majority of the perimeter of the filter basket.

17. The infusing device of claim 13, wherein the holding section extends around at least a majority of the perimeter of the filter basket.

18. The infusing device of claim 13, wherein the second holding section is formed by two or more projections extending outward from the outer surface of the filter basket.

19. The infusing device of claim 13, wherein the filter basket further comprises a retaining ring configured to hold a disposable filter within the filter basket.

20. The infusing device of claim 13, wherein the filter basket holder is formed by a plate adapted to rest on a rim of a second container, the plate further comprising a plurality of holes, each of the plurality of holes formed as the interior opening of the filter basket holder, the plurality of holes configured to support a plurality of filter baskets in the brewing position and in the draining position.

* * * * *